United States Patent
Huang et al.

(10) Patent No.: US 9,515,526 B2
(45) Date of Patent: Dec. 6, 2016

(54) MOTOR AND ROTOR THEREOF

(75) Inventors: Hui Huang, Guangdong (CN);
Wenming Zhang, Guangdong (CN);
Yong Xiao, Guangdong (CN); Xueying Zeng, Guangdong (CN); Huajie Chen, Guangdong (CN); Dongsuo Chen, Guangdong (CN); Yusheng Hu, Guangdong (CN)

(73) Assignees: Gree Electric Appliances, Inc. of Zhuhai, Zhuhai, Guangdong (CN);
Gree Green Refrigeration Technology Center Co., Ltd. of Zhuhai, Zhuhai, Guangdong (CN)

( * ) Notice: Subject to any disclaimer, the term of this patent is extended or adjusted under 35 U.S.C. 154(b) by 360 days.

(21) Appl. No.: 14/235,617

(22) PCT Filed: Aug. 29, 2011

(86) PCT No.: PCT/CN2011/079060
§ 371 (c)(1),
(2), (4) Date: Jan. 28, 2014

(87) PCT Pub. No.: WO2013/020311
PCT Pub. Date: Feb. 14, 2013

(65) Prior Publication Data
US 2014/0175932 A1    Jun. 26, 2014

(30) Foreign Application Priority Data

Aug. 5, 2011 (CN) .......................... 2011 1 0224395

(51) Int. Cl.
*H02K 1/27* (2006.01)
*H02K 1/24* (2006.01)

(52) U.S. Cl.
CPC ............ *H02K 1/2766* (2013.01); *H02K 1/246* (2013.01); *H02K 2213/03* (2013.01)

(58) Field of Classification Search
CPC ........ H02K 1/32; H02K 21/12; H02K 21/14; H02K 29/03
See application file for complete search history.

(56) References Cited

U.S. PATENT DOCUMENTS

| 4,358,697 A | 11/1982 | Liu et al. |
| 4,924,130 A | 5/1990 | Fratta |

(Continued)

FOREIGN PATENT DOCUMENTS

| CN | 1149778 | 5/1997 |
| CN | 1243351 | 2/2000 |

(Continued)

OTHER PUBLICATIONS

International Search Report issued by the State Intellectual Property Office of the P.R. China (Chinese language), dated Apr. 1, 2012, for related International Application No. PCT/CN2011/079060; 4 pages.

(Continued)

*Primary Examiner* — Tran Nguyen
(74) *Attorney, Agent, or Firm* — Faegre Baker Daniels LLP

(57) ABSTRACT

A motor and a rotor thereof are provided. Taking the distance between the two endpoints of a permanent magnet of a motor rotor that are on the side away from the center of an iron core as the length L of the permanent magnet, and the distance between a line connecting the two endpoints of the permanent magnet that are on the side away from the center of the iron core and the center point on the side of the permanent magnet that is close to the centerline of the iron core as the width H of the permanent magnet, then H/L ≥ 1/10. By adjusting the relationship between the length L and width H of the permanent magnet, the air gap magnetic density of the permanent magnet can be effectively increased.

7 Claims, 4 Drawing Sheets

(56) References Cited

U.S. PATENT DOCUMENTS

| | | | |
|---|---|---|---|
| 5,818,140 | A | 10/1998 | Vagati |
| 5,903,080 | A | 5/1999 | Nashiki et al. |
| 5,945,760 | A | 8/1999 | Honda et al. |
| 6,218,753 | B1 | 4/2001 | Asano et al. |
| 6,239,526 | B1 | 5/2001 | Oh et al. |
| 6,630,762 | B2 | 10/2003 | Naito |
| 6,703,744 | B2 | 3/2004 | Yoshinaga et al. |
| 6,815,859 | B2 | 11/2004 | Sakuma et al. |
| 6,836,045 | B2 | 12/2004 | Murakami et al. |
| 7,019,426 | B2 | 3/2006 | Mori |
| 7,902,710 | B2 | 3/2011 | Han et al. |
| 7,939,982 | B2 | 5/2011 | Horst |
| 7,981,359 | B2 | 7/2011 | Masuzawa et al. |
| 8,772,994 | B2 | 7/2014 | Feng |
| 2002/0089251 | A1 | 7/2002 | Tajima et al. |
| 2002/0153796 | A1 | 10/2002 | Yoshinaga |
| 2002/0175583 | A1 | 11/2002 | Kikuchi et al. |
| 2003/0030343 | A1 | 2/2003 | Naito et al. |
| 2003/0094875 | A1 | 5/2003 | Sakuma |
| 2005/0110355 | A1 | 5/2005 | Sakuma |
| 2006/0103254 | A1* | 5/2006 | Horst ............... H02K 1/276 310/156.53 |
| 2006/0145561 | A1 | 7/2006 | Sakuma |
| 2007/0096579 | A1 | 5/2007 | Aydin et al. |
| 2010/0052455 | A1 | 3/2010 | Feng |
| 2010/0141076 | A1 | 6/2010 | Blissenbach |
| 2014/0152139 | A1 | 6/2014 | Huang et al. |

FOREIGN PATENT DOCUMENTS

| | | |
|---|---|---|
| CN | 1158741 C | 3/2001 |
| CN | 1388625 | 1/2003 |
| CN | 1405948 | 3/2003 |
| CN | 2560153 Y | 7/2003 |
| CN | 1505239 A | 6/2004 |
| CN | 2681433 | 2/2005 |
| CN | 101026318 | 8/2007 |
| CN | 101304204 | 11/2008 |
| CN | 101359847 | 2/2009 |
| CN | 101488679 | 7/2009 |
| CN | 101714805 | 9/2009 |
| CN | 101777809 | 7/2010 |
| CN | 102111051 A | 6/2011 |
| CN | 202260714 | 8/2011 |
| CN | 202142924 | 2/2012 |
| CN | 202142925 | 2/2012 |
| CN | 202142926 | 2/2012 |
| CN | 202145610 | 2/2012 |
| CN | 202145611 | 2/2012 |
| CN | 102769365 | 11/2012 |
| EP | 0746079 | 12/1996 |
| EP | 1283581 | 2/2003 |
| JP | 09233744 | 9/1997 |
| JP | 09308198 | 11/1997 |
| JP | 11-275783 | 10/1999 |
| JP | 2001178045 | 6/2001 |
| JP | 2002272031 | 9/2002 |
| JP | 2003264974 | 9/2003 |
| JP | 2009044860 | 2/2009 |
| JP | 2010213553 | 9/2010 |
| JP | 2010226784 | 10/2010 |
| JP | 2011083066 | 4/2011 |

OTHER PUBLICATIONS

International Search Report issued by the State Intellectual Property Office of the P.R. China (English translation), dated Apr. 1, 2012, for related International Application No. PCT/CN2011/079060; 2 pages.

International Search Report issued by the State Intellectual Property Office of P.R. China (Chinese language), Nov. 24, 2011, for related International Application No. PCT/CN2011/079181; 3 pages.

English translation of the International Search Report issued by the State Intellectual Property Office of P.R. China, Nov. 24, 2011, for related International Application No. PCT/CN2011/079181; 3 pages.

International Preliminary Report on Patentability and Written Opinion issued by the State Intellectual Property Office of the P.R. China (English language), dated Jan. 28, 2014, for related International Application No. PCT/CN2011/079181; 6 pages.

Written Opinion issued by the State Intellectual Property Office of the P.R. China (Chinese language), dated Nov. 24, 2011, for related International Application No. PCT/CN2011/079181; 4 pages.

English translation of the Written Opinion issued by the State Intellectual Property Office of the P.R. China, dated Nov. 24, 2011, for related International Application No. PCT/CN2011/079181; 4 pages.

International Search Report (Chinese language) issued by the State Intellectual Property Office of the P.R. China, dated Mar. 28, 2012, for related International Application No. PCT/CN2011/079169; 5 pages.

English translation of the International Search Report issued by the State Intellectual Property Office of the P.R. China, dated Mar. 28, 2012, for related International Application No. PCT/CN2011/079169; 3 pages.

International Preliminary Report on Patentability and Written Opinion issued by the State Intellectual Property Office of the P.R. China, dated Feb. 11, 2014, for related International Application No. PCT/CN2011/079169; 6 pages.

Written Opinion (Chinese language) issued by the State Intellectual Property Office of the P.R. China, dated Apr. 26, 2012, for related International Application No. PCT/CN2011/079169; 5 pages.

English translation of the Written Opinion issued by the State Intellectual Property Office of the P.R. China, dated Apr. 26, 2012, for related International Application No. PCT/CN2011/079169; 6 pages.

International Search Report issued by the State Intellectual Property Office of the P.R. China (Chinese language), dated Apr. 11 2012, for related International Application No. PCT/CN2011/079062; 6 pages.

English translation of the International Search Report issued by the State Intellectual Property Office of the P.R. China, dated Apr. 11 2012, for related International Application No. PCT/CN2011/079062; 4 pages.

International Preliminary Report on Patentability and Written Opinion issued by the State Intellectual Property Office of the P.R. China, dated Feb. 11, 2014, for related International Application No. PCT/CN2011/079062; 6 pages.

Written Opinion (Chinese language) issued by the State Intellectual Property Office of the P.R. China, dated May 17, 2012, for related International Application No. PCT/CN2011/079062; 5 pages.

English translation of the Written Opinion issued by the State Intellectual Property Office of the P.R. China, dated May 17, 2012, for related International Application No. PCT/CN2011/079062; 8 pages.

International Search Report issued by the State Intellectual Property Office of the P.R. China (Chinese language), dated Apr. 11, 2012, for related International Application No. PCT/CN2011/079059; 5 pages.

English translation of the International Search Report issued by the State Intellectual Property Office of the P.R. China, dated Apr. 11, 2012, for related International Application No. PCT/CN2011/079059; 4 pages.

International Preliminary Report on Patentability and Written Opinion issued by the State Intellectual Property Office of the P.R. China, dated Feb. 11, 2014, for related International Application No. PCT/CN2011/079059; 6 pages.

Written Opinion (Chinese language) issued by the State Intellectual Property Office of the P.R. China, dated May 3, 2012, for related International Application No. PCT/CN2011/079059; 5 pages.

English translation of the Written Opinion issued by the State Intellectual Property Office of the P.R. China, dated May 3, 2012, for related International Application No. PCT/CN2011/079059; 8 pages.

(56) References Cited

OTHER PUBLICATIONS

International Search Report (Chinese language) issued by the State Intellectual Property Office of the P.R. China, dated Apr. 4, 2012, for related International Application No. PCT/CN2011/079064; 5 pages.
English translation of the International Search Report issued by the State Intellectual Property Office of the P.R. China, dated Apr. 4, 2012, for related International Application No. PCT/CN2011/079064; 3 pages.
International Preliminary Report on Patentability and Written Opinion issued by the State Intellectual Property Office of the P.R. China (with English translation), dated Feb. 11, 2014, for related International Application No. PCT/CN2011/079064, 15 pgs.
Written Opinion issued by the State Intellectual Property Office of the P.R. China (Chinese language), dated May 10, 2014, for related International Application No. PCT/CN2011/079064; 5 pages.
English translation of the Written Opinion issued by the State Intellectual Property Office of the P.R. China, dated May 10, 2012, for related International Application No. PCT/CN2011/079064; 8 pages.
International Preliminary Report on Patentability and Written Opinion issued by the State Intellectual Property Office of the P.R. China, dated Feb. 11, 2014, for related International Application No. PCT/CN2011/079060; 4 pages.
Written Opinion (Chinese language) issued by the State Intellectual Property Office of the P.R. China, dated May 10, 2012, for related International Application No. PCT/CN2011/079060; 3 pages.
English translation of the Written Opinion issued by the State Intellectual Property Office of the P.R. China, dated May 10, 2012, for related International Application No. PCT/CN2011/079060; 4 pages.
First Examination Report (Chinese language) issued by the State Intellectual Property Office of the People's Republic of China, dated Feb. 7, 2013, for Chinese Patent Application No. 201110212590.0 (English Summary attached), Publication No. CN 102769365A; available at the European Patent Register at https://register.epo.org; 6 pages.
English translation of the First Examination Report issued by the State Intellectual Property Office of the P.R. China, dated Feb. 7, 2013, for Chinese Patent Application No. 2011102123590.0, Publication No. CN 102769365A; available at the European Patent Register at https://register.epo.org; 5 pages.
Second Examination Report (Chinese language) issued by the State Intellectual Property Office of the P.R. of China, dated Apr. 2, 2013, for Chinese Patent Application No. 201110212590.0 (English Summary attached), Publication No. CN 102769365A; available at the European Patent Register at https://register.epo.org; 6 pages.
English translation of the Second Examination Report issued by the State Intellectual Property Office of the P.R. China, dated Apr. 2, 2013, for Chinese Patent Application No. 201110212590.0, Publication No. CN 102769365A; available at the European Patent Register at https://register.epo.org; 5 pages.
Third Examination Report (Chinese language) issued by the State Intellectual Property Office of the People's Republic of China, dated Jun. 20, 2013, for Chinese Patent Application No. 201110212590.0 (English summary attached), Publication No. CN 102769365A; available at the European Patent Register at https://register.epo.org; 5 pages.
English translation of the Third Examination Report issued by the State Intellectual Property Office of the P.R. China, dated Jun. 20, 2013, for Chinese Patent Application No. 201110212590.0, Publication No. CN 102769365A; available at the European Patent Register at https://register.epo.org; 6 pages.
Search Report issued by the State Intellectual Property Office of the P.R. China, dated Jan. 24, 2013, for Chinese Patent Application No. 201110212590.0; Publication No. CN 102769365A; available at the European Patent Register at https://register.epo.org; 2 pages.
Supplemental Search Report issued by the State Intellectual Property Office of the P.R. China, dated Mar. 25, 2013, for Chinese Patent Application No. 201110212590.0, Publication No. CN 102769365A; available at the European Patent Register at https://register.epo.org; 1 page.
Examination Report (Chinese language) issued by the State Intellectual Property Office of the P.R. China, dated Feb. 8, 2013, for Chinese Patent Application No. 201110223492.7, Publication No. CN 102790502A; available at the European Patent Register at https://register.epo.org; 4 pages.
English translation of the Examination Report issued by the State Intellectual Property Office of the P.R. China, dated Feb. 8, 2013, for Chinese Patent Application No. 201110223492.7, Publication No. CN 102790502A; available at the European Patent Register at https://register.epo.org; 5 pages.
Search Report issued by the State Intellectual Property Office of the P.R. China, dated Jan. 31, 2013, for Chinese Patent Application No. 201110223492.7, Publication No. CN 102790502A; available at the European Patent Register at https://register.epo.org; 1 page.
Supplemental Search Report issued by the State Intellectual Property Office of the P.R. China, dated Nov. 1, 2013, for Chinese Patent Application No. 201110223492.7, Publication No. CN 102790502A; available at the European Patent Register at https://register.epo.org; 1 page.
Examination Report (Chinese language) issued by the State Intellectual Property Office of the P.R. China, dated Feb. 1, 2013, for Chinese Patent Application No. 201110224896.8, Publication No. CN 102761183A; available at the European Patent Register at https://register.epo.org; 8 pages.
English translation of the Examination Report issued by the State Intellectual Property Office of the P.R. China, dated Feb. 1, 2013, for Chinese Patent Application No. 201110224896.8, Publication No. CN 102761183A; available at the European Patent Register at https://register.epo.org; 9 pages.
Search Report issued by the State Intellectual Property Office of the P.R. China, dated Jan. 23, 2013, for Chinese Patent Application No. 201110224896.8, Publication No. CN 102761183A; available at the European Patent Register at https://register.epo.org; 4 pages.
First Examination Report (Chinese language) issued by the State Intellectual Property Office of the P.R. China, dated Mar. 8, 2013, for Chinese Patent Application No. 201110224391.1, Publication No. CN 102801235A; available at the European Patent Register at https://register.epo.org; 5 pages.
English translation of the First Examination Report issued by the State Intellectual Property Office of the P.R. China, dated Mar. 8, 2013, for Chinese Patent Application No. 201110224391.1, Publication No. CN 102801235A; available at the European Patent Register at https://register.epo.org; 7 pages.
Second Examination Report (Chinese language) issued by the State Intellectual Property Office of the P.R. China, dated May 15, 2013, for Chinese Patent Application No. 201110224391.1, Publication No. CN 102801235A; available at the European Patent Register at https://register.epo.org; 4 pages.
English translation of the Second Examination Report issued by the State Intellectual Property Office of the P.R. China, dated May 15, 2013, for Chinese Patent Application No. 201110224391.1, Publication No. CN 102801235A; available at the European Patent Register at https://register.epo.org; 5 pages.
Search Report issued by the State Intellectual Property Office of the P.R. China, dated Feb. 28, 2013, for Chinese Patent Application No. 201110224391.1, Publication No. CN 102801235A; available at the European Patent Register at https://register.epo.org; 1 page.
First Examination Report (Chinese language) issued by the State Intellectual Property Office of the P.R. China, dated Feb. 16, 2013, for Chinese Patent Application No. 201110224882.6 (English Summary attached), Publication No. CN 102780291A; available at the European Patent Register at https://register.epo.org; 8 pages.
English translation of the First Examination Report issued by the State Intellectual Property Office of the P.R. China, dated Feb. 16, 2013, for Chinese Patent Application No. 201110224882.6, Publication No. CN 102780291A; available at the European Patent Register at https://register.epo.org; 8 pages.
Second Examination Report (Chinese language) issued by the State Intellectual Property Office of the P.R. China, dated Apr. 18, 2013,

(56) References Cited

OTHER PUBLICATIONS for Chinese Patent Application No. 201110224882.6, Publication No. CN 102780291A; available at the European Patent Register at https://register.epo.org; 6 pages.
English translation of the Second Examination Report issued by the State Intellectual Property Office of the P.R. China, dated Apr. 18, 2013, for Chinese Patent Application No. 201110224882.6, Publication No. CN 102780291A; available at the European Patent Register at https://register.epo.org; 7 pages.
Search Report issued by the State Intellectual Property Office of the P.R. China, dated Feb. 1, 2013, for Chinese Patent Application No. 201110224882.6, Publication No. CN 102780291A; available at the European Patent Register at https://register.epo.org; 2 pages.
Supplemental Search Report issued by the State Intellectual Property Office of the P.R. China, dated Apr. 10, 2013, for Chinese Patent Application No. 201110224882.6, Publication No. CN 102780291A; available at the European Patent Register at https://register.epo.org; 1 page.
Examination Report (Chinese language) issued by the State Intellectual Property Office of the P.R. China, dated Jan. 4, 2013, for Chinese Patent Application No. 201110224395.X, Publication No. CN 102761182A; available at the European Patent Register at https://register.epo.org; 4 pages.
English translation of the Examination Report issued by the State Intellectual Property Office of the P.R. China, dated Jan. 4, 2013, for Chinese Patent Application No. 201110224395.X, Publication No. CN 102761182A; available at the European Patent Register at https://register.epo.org; 4 pages.
Search Report issued by the State Intellectual Property Office of the P.R. China, dated Dec. 25, 2012, for Chinese Patent Application No. 201110224395.X, Publication No. CN 102761182A; available at the European Patent Register at https://register.epo.org; 1 page.

* cited by examiner

MOTOR AND ROTOR THEREOF

CROSS-REFERENCE TO RELATED APPLICATIONS

The present application is the national phase of International Application No. PCT/CN2011/079060, titled "MOTOR AND ROTOR THEREOF", filed on Aug. 29, 2011, which claims the benefit of priority to Chinese Patent Application No. 201110224395.X, entitled "MOTOR AND ROTOR THEREOF", filed with the Chinese State Intellectual Property Office on Aug. 5, 2011, both of which applications are incorporated herein in their entireties by this reference.

TECHNICAL FIELD

The present application relates to the technical field of motors, and in particular to a motor rotor and a motor having the same.

BACKGROUND

An interior permanent magnet synchronous motor (IPM) is a motor having a layer of permanent magnet placed inside a rotor and primarily utilizing permanent magnet torque and utilizing auxiliary reluctance torque.

Resultant formula of the reluctance torque and the permanent magnet torque is as follows: $T=mp(L_q-L_d)i_d i_q + mp\psi_{PM} i_q$.

In the above formula, T is an output torque of a motor, the performance of the motor can be improved by increasing the value of T; the first item in the equation following T is the reluctance torque, and the second item is the permanent magnet torque; $\Psi_{PM}$ is the maximum value of stator-rotor coupling magnetic flux generated by a permanent magnet of the motor, m is a phase number of a conductor of a stator, $L_d$ and $L_q$ are inductances along axis d and axis q respectively, wherein axis d refers to an axis coincided with an axis of the main magnetic pole, and axis q refers to an axis perpendicular to the axis of the main magnetic pole, the perpendicular relationship refers to perpendicularity of electrical angles, and $i_d$ and $i_q$ are components of an armature current in the directions of axis d and axis q respectively. As can be seen from the above resultant formula, the output torque of the motor T can be increased by increasing both the permanent magnet torque as the second item and a difference of the inductances along axis d and axis q of the motor.

In the prior art, the performance of the motor is generally improved by improving the performance of the permanent magnet, that is, by increasing the permanent magnet torque to increase the value of the resultant torque so as to improve the efficiency of the motor, and the common method is to use rare-earth permanent magnets. However, since rare earth is a non-renewable resource and is expensive, the widespread use of this kind of motor is restricted. In addition, due to the limited volume of the rotor, the occupation ratio of the permanent magnets in each pole of the rotor has a limit value, thus it is difficult to increase the output torque of the motor by increasing the usage amount of the permanent magnetic, which also limits the improvement of the motor efficiency.

SUMMARY

The present application provides a motor rotor and a motor having the same, which may increase the utilization rate of permanent magnet, thereby improving the performance of the motor rotor.

According to one aspect of the present application, the motor rotor includes an iron core and a permanent magnet arranged inside the iron core, a plurality of groups of mounting grooves are arranged in the iron core along a circumferential direction of the iron core, and each group of mounting grooves includes two or more than two mounting grooves arranged at intervals in a radial direction of the iron core; a plurality of groups of permanent magnets are provided, and permanent magnets in each group of permanent magnets are correspondingly embedded into corresponding mounting grooves in each group of mounting grooves; and on a cross section, perpendicular to an axial direction of the iron core, of the permanent magnet, a length L of the permanent magnet is a distance between two endpoints of a side, away from a center of the iron core, of the permanent magnet, and a width H of the permanent magnet is a distance from a midpoint of a connecting line connecting the two endpoints of the side, away from the center of the iron core, of the permanent magnet to a midpoint of a side, close to the center of the iron core, of the permanent magnet, and $$\frac{H}{L} \geq \frac{1}{10}.$$

Further, each group of mounting grooves includes a first mounting groove and a second mounting groove, the permanent magnets embedded in the first mounting groove and the second mounting groove are respectively a first permanent magnet and a second permanent magnet; and a length and a width of the first permanent magnet are respectively La1 and Ha1, and $$\frac{3}{10} \leq \frac{Ha1}{La1} \leq \frac{7}{10}.$$

Further, a length and a width of the second permanent magnet are respectively La2 and Ha2, and $$\frac{3}{10} \leq \frac{Ha2}{La2} \leq \frac{7}{10}.$$

Further, each group of mounting grooves includes a first mounting groove, a second mounting groove and a third mounting groove, the permanent magnets embedded in the first mounting groove, the second mounting groove and the third mounting groove are a first permanent magnet, a second permanent magnet and a third permanent magnet, respectively; and a length and a width of the first permanent magnet are respectively Lb1 and Hb1, and $$\frac{1}{10} \leq \frac{Hb1}{Lb1} \leq \frac{1}{2}.$$

Further, a length and a width of the second permanent magnet are respectively Lb2 and Hb2, and $$\frac{1}{10} \leq \frac{Hb2}{Lb2} \leq \frac{1}{2}.$$

Further, a length and a width of the third permanent magnet are respectively Lb3 and Hb3, and $$\frac{1}{10} \leq \frac{Hb3}{Lb3} \leq \frac{1}{2}.$$

According to one aspect of the present application, a motor is provided, which includes the above motor rotor.

In the motor rotor and the motor having the same, the length L of the permanent magnet is the distance between two endpoints of a side, away from the center of the iron core, of the permanent magnet, and the width H of the permanent magnet is the distance from a midpoint of a connecting line connecting the two endpoints of the side, away from the center of the iron core, of the permanent magnet to a midpoint of a side, close to the center of the iron core, of the permanent magnet. Based on experimental results, the magnetic field intensity in the air around the permanent magnetic and the air-gap magnetic flux density of the permanent magnetic may be increased effectively by adjusting the relationship between the length L and the width H of the permanent magnet, i.e. the permanent magnetic flux of the rotor in the directions of axis d and axis q may be effectively increased, thereby improving the utilization rate of the permanent magnet and the performance of the motor without increasing the usage amount of permanent magnets.

BRIEF DESCRIPTION OF THE DRAWINGS

The accompanying drawings constituting a part of the present application are provided to help further understanding the present application, and the illustrative embodiments and the description thereof are used to interpret the present application and do not constitute inappropriate limitations to the present application.

DETAILED DESCRIPTION

The present application will be described in detail hereinafter in conjunction with the drawings and embodiments.

The present application studies the relationship between a distance between two endpoints, extending to a mounting groove, of an inner arc of a permanent magnet 20 placed in a mounting groove 20 of the motor rotor, and a distance, in a direction of axis d, from a midpoint of an outer arc of the same permanent magnet 20 to a midpoint of a connecting line connecting the two endpoints of the inner arc, and provides a method for improving the utilization rate of the permanent magnet torque without changing the usage amount of the permanent magnet 20, i.e. provides an optimum design of the dimension of the permanent magnet, thereby maximizing the resultant torque of the motor and improving the motor efficiency.

Figure 1:
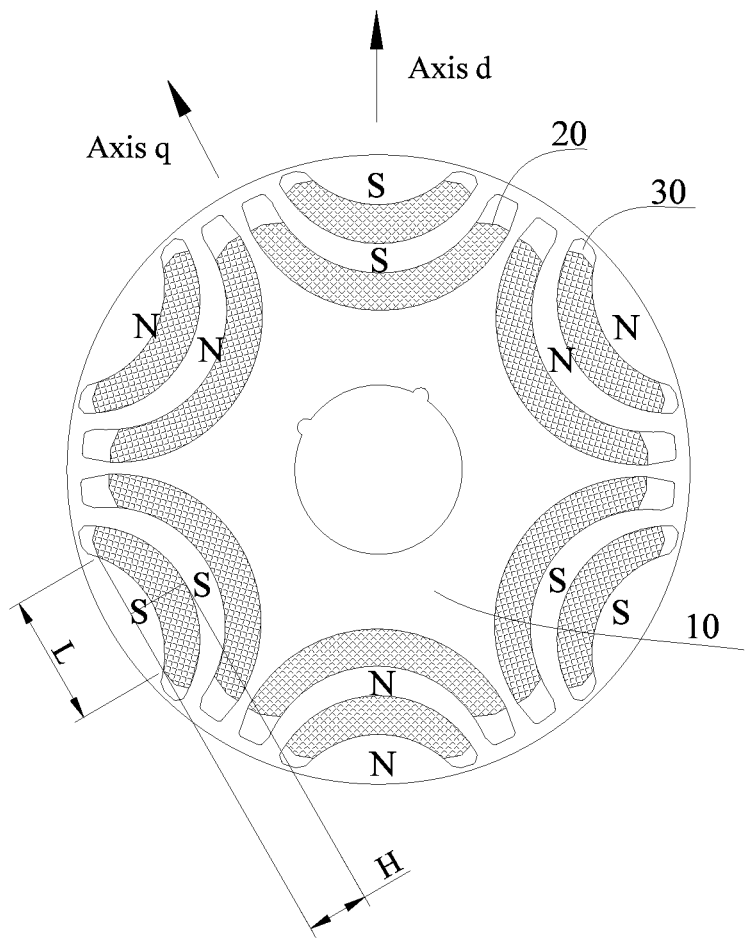
FIG. 1 is a schematic view showing the structure of a motor rotor according to an embodiment of the present application.

As shown in FIG. 1, a motor rotor according to the present application includes an iron core 10 and a permanent magnet 20 arranged inside the iron core 10. Multiple groups of mounting grooves 30 are arranged in the iron core 10 along the circumferential direction of the iron core 10, and each group of mounting grooves 30 includes two or more than two mounting grooves 30 arranged at intervals in the radial direction of the iron core 10. There are multiple groups of permanent magnets 20, and permanent magnets 20 in each group of permanent magnets 20 are correspondingly embedded into corresponding mounting grooves 30 in each group of mounting grooves 30. On a cross section, perpendicular to an axial direction of the iron core 10, of the permanent magnet 20, a length L of the permanent magnet 20 is a distance between two endpoints of a side, away from a center of the iron core 10, of the permanent magnet 20, and a width H of the permanent magnet 20 is a distance from a midpoint of a connecting line connecting the two endpoints of the side, away from the center of the iron core 10, of the permanent magnet 20 to a midpoint of a side, close to the center of the iron core 10, of the permanent magnet 20, and $$\frac{H}{L} \geq \frac{1}{10}.$$

As shown in FIG. 1, the motor rotor according to the present application includes the iron core 10 formed by laminated silicon steel sheets, and the permanent magnet 20 embedded in the iron core 10. The iron core 10 of the motor rotor includes multiple groups of mounting grooves 30 passing through the iron core 10, each group of mounting grooves 30 includes more than two layers of mounting grooves 30 which are separated by the iron core. The permanent magnets 20 are embedded in the mounting grooves 30. When placing permanent magnets 20 into the mounting grooves 30, it requires that the permanent magnets 20 in the same group have the same polarity in a direction toward a periphery of the motor rotor, for example as shown in FIG. 1, the two layers of permanent magnets both show S polarity in the direction of axis d; and at the same time, it also requires that two adjacent groups of permanent magnets 20 show opposite polarities, thus all groups of permanent magnets 20 are distributed along the circumferential direction of the motor rotor to show N polarity and S polarity alternately. A clearance is provided at both ends of the mounting groove 30, after the permanent magnet 30 is placed in the mounting groove 30, and the clearance may be filled with air or non-magnetically permeable media. A magnetic flux path with a certain width formed by silicon steel sheets is arranged between two adjacent layers of permanent magnets 20 in the same group of permanent magnets 20, and a connecting rib with an inconstant width formed by silicon steel sheets is arranged between two adjacent mounting grooves 30 of the motor rotor.

The permanent magnets 20 are placed inside the mounting grooves 30, thus the rotor may provide the reluctance torque. Since multiple layers of permanent magnets 20 are placed in the direction of axis d, and the permanent magnet 20 has a relatively high magnetic reluctance and has a magnetic permeability approximately equal to air, an inductance Ld in the direction of axis d is relatively low, however, in the direction of axis q, the iron core 10 has a relatively high magnetic permeability, thus an inductance $L_q$ in the direction of axis q is relatively high, thereby increasing the magnetic reluctance torque of the motor rotor, and in turn increasing the output torque of the motor and improving the efficiency of the motor. Such an approach for improving the efficiency of the motor may substitute the method of improving the efficiency of the motor by increasing the rare-earth permanent magnets, thereby reducing the usage of the rare earth, which on one hand, saves energy and mitigates the environment burden, and at the other hand, reduces the cost and improves the product competitiveness.

Figure 5:
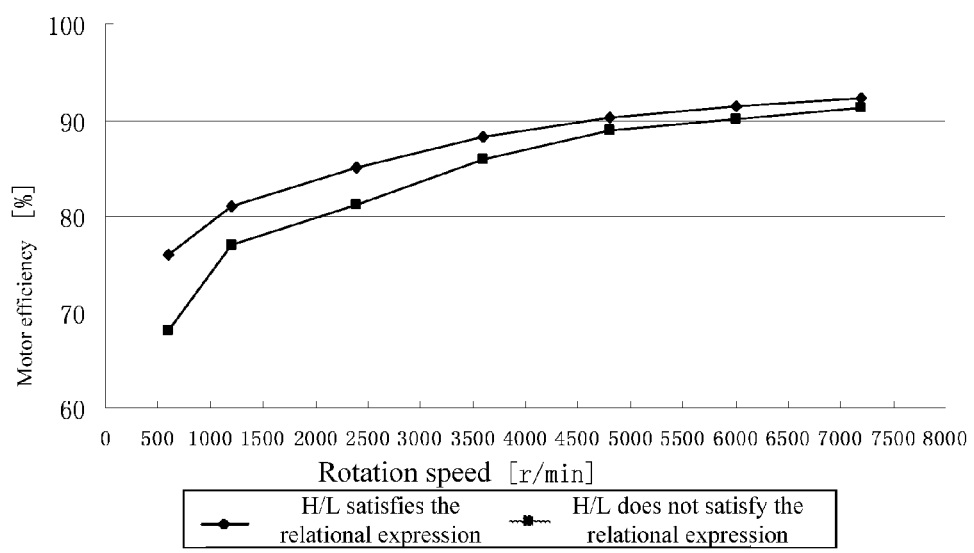
FIG. 5 is a schematic view showing the relationship between the value of H/L and the motor efficiency according to the embodiment of the present application.
Figure 6:
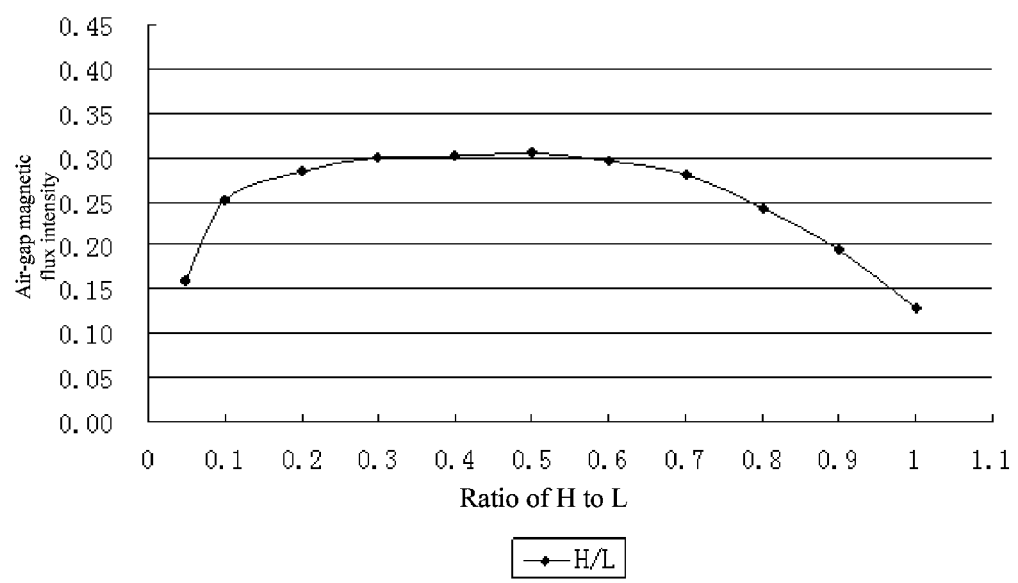
FIG. 6 is a schematic view showing the relationship between the value of H/L of the motor rotor and an air-gap magnetic flux density according to the present application.

Further, since the rotor is inserted with the permanent magnet 20, the rotor may also provide the permanent magnetic torque. The length L of the permanent magnet 20 is the distance between two endpoints of a side, away from the center of the iron core 10, of the permanent magnet 20, and the width H of the permanent magnet 20 is the distance from a midpoint of a connecting line connecting the two endpoints of the side, away from the center of the iron core 10, of the permanent magnet 20 to a midpoint of a side, close to the center of the iron core 10, of the permanent magnet 20. Based on experimental results, the air-gap magnetic flux density (the air-gap magnetic flux density refers to the magnetic field intensity in the air, and the larger the air-gap magnetic flux density is, the larger the torque of the permanent magnet is) of the permanent magnet may be increased effectively by adjusting the length L and the width H of the permanent magnet, i.e. the permanent magnetic flux of the rotor in the directions of axis d and axis q may be effectively increased, thereby improving the utilization rate of the permanent magnet and the performance of the motor without increasing the usage amount of permanent magnets. As shown in FIG. 5, when a ratio of H to L satisfies an expression of $$\frac{H}{L} \geq \frac{1}{10},$$

the air-gap magnetic flux density enters a steady increasing stage.

Figure 2:
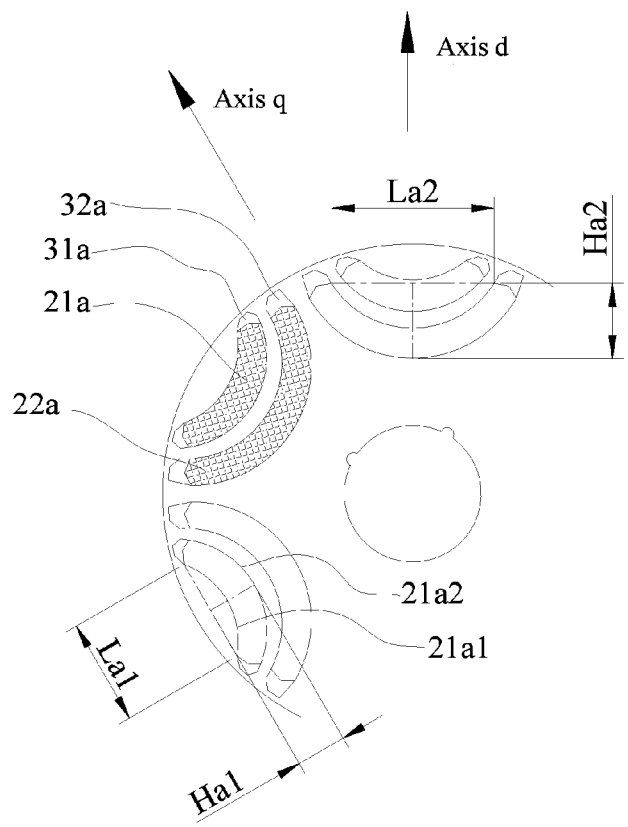
FIG. 2 is a schematic view showing a length L and a width H of a permanent magnet according to the embodiment of the present application.

According to a first embodiment of the present application, as shown in FIG. 2, each group of mounting grooves 30 includes a first mounting groove 31a and a second mounting groove 32a, the permanent magnets 20 embedded in the first mounting groove 31a and the second mounting groove 32a are respectively a first permanent magnet 21a and a second permanent magnet 22a. A length and a width of the first permanent magnet 21a are respectively La1 and Ha1, and $$\frac{3}{10} \leq \frac{Ha1}{La1} \leq \frac{7}{10}.$$

Further, a length and a width of the second permanent magnet 22a are respectively La2 and Ha2, and $$\frac{3}{10} \leq \frac{Ha2}{La2} \leq \frac{7}{10}.$$

Figure 3:
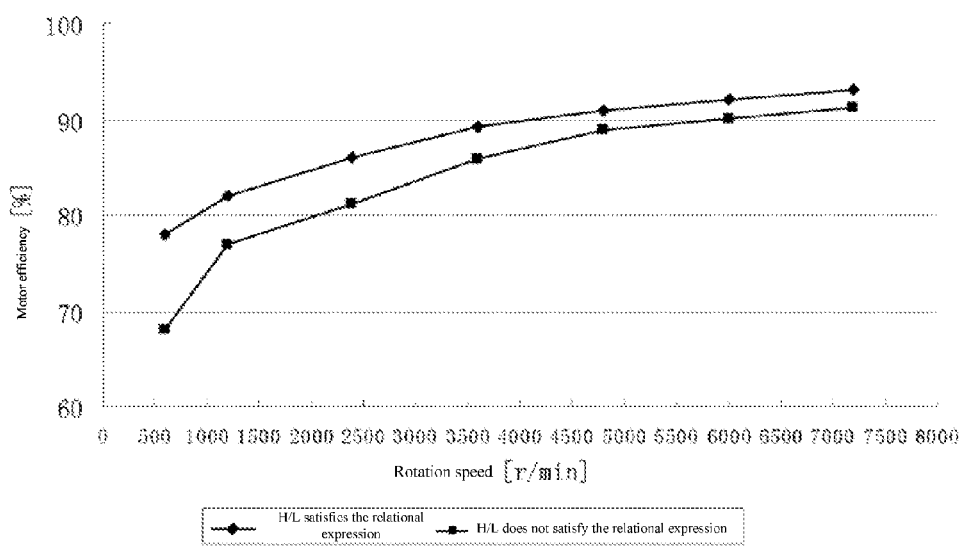
FIG. 3 is a schematic view showing the relationship between a value of H/L and a motor efficiency according to the embodiment of the present application.

As shown in FIG. 2, reference numerals 21 and 22 refer to a first layer of permanent magnets inserted in the first mounting groove 31a and a second layer of permanent magnets inserted in the second mounting groove 32a, respectively. Each polar of the rotor has a certain fan-shaped area, thus the curvature of the arc-shaped permanent magnet and the depth of the arc seem to be arbitrary from the perspective of the structure. However, based on experimental results, when a ratio of Ha1 to La1 meets the relational expression of $$\frac{3}{10} \leq \frac{Ha1}{La1} \leq \frac{7}{10},$$

the permanent magnetic flux may be increased without changing the volume of the permanent magnet 20, wherein La1 is the distance between the two endpoints, extending towards two sides till intersecting with the mounting groove 31a, of an inner arc 21a1 of the permanent magnetic, and Ha1 is a distance, in the direction of axis d, from a midpoint of an outer arc 21a2 of the permanent magnet to a connecting line connecting the two endpoints of the inner arc 21a1. A curve showing the relationship between the value of H/L and the motor efficiency shown in FIG. 3 is based on averages of multiple groups of experimental data in the range. When the value of H/L meets the relational expression of $$\frac{3}{10} \leq \frac{Ha1}{La1} \leq \frac{7}{10},$$

the motor efficiency is higher than that in the case that the value of H/L does not meet the relational expression, and the effect generated by in a case when meeting the relational expression is more significant when the motor is operated at a low speed. When the length La2 and the width Ha2 of the second permanent magnetic 22a in the second mounting groove 32a meet the relational expression of $$\frac{3}{10} \leq \frac{Ha2}{La2} \leq \frac{7}{10},$$

the motor efficiency may be further improved.

Figure 4:
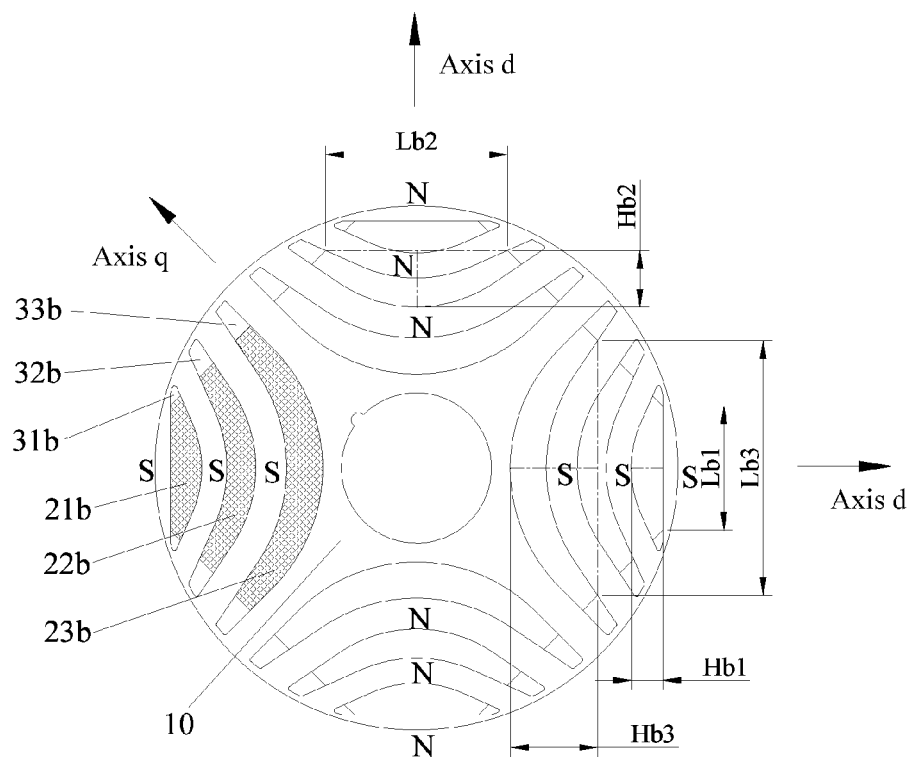
FIG. 4 is a schematic view showing the structure of the motor rotor and the length L and the width H of the permanent magnet according to another embodiment of the present application.

According to a second embodiment of the present application, as shown in FIG. 4, each group of mounting grooves 30 includes a first mounting groove 31b, a second mounting groove 32b and a third mounting groove 33b, the permanent magnets 20 embedded in the first mounting groove 31b, the second mounting groove 32b and the third mounting groove 33b are a first permanent magnet 21b, a second permanent magnet 22b and a third permanent magnet 23b, respectively. A length and a width of the first permanent magnet 21b are respectively Lb1 and Hb1, and $$\frac{1}{10} \leq \frac{Hb1}{Lb1} \leq \frac{1}{2}.$$

A length and a width of the second permanent magnet 22b are respectively Lb2 and Hb2, and $$\frac{1}{10} \leq \frac{Hb2}{Lb2} \leq \frac{1}{2}.$$

A length and a width of the third permanent magnet 23b are respectively Lb3 and Hb3, and $$\frac{1}{10} \leq \frac{Hb3}{Lb3} \leq \frac{1}{2}.$$

The above relational expressions are preferably applicable to the rotor having two layers of permanent magnets 20, the number of the groups of the permanent magnets 20 is not limited to six poles as shown in FIG. 2, and the relational expressions are also applicable to the rotors with four poles or eight poles.

As shown in FIG. 4, in this embodiment, each group of mounting grooves 30 includes three layers of mounting grooves which are respectively the first mounting groove 31b, the second mounting groove 32b and the third mounting groove 33b. Based on the experimental results, when a ratio of Hb1 to Lb1 meets the relational expression of $$\frac{1}{10} \leq \frac{Hb1}{Lb1} \leq \frac{1}{2},$$

the permanent magnetic flux may be increased without changing the volume of the permanent magnet, thereby increasing the permanent magnetic torque of the motor and eventually improving the motor efficiency, wherein Lb1 is a distance between the two endpoints, extending towards two sides till intersecting with the mounting groove 31b, of an inner arc of the permanent magnetic 21b, and Ha1 is a distance, in the direction of axis d, from a midpoint of an outer arc of the permanent magnet 21b to a connecting line connecting the two endpoints of the inner arc. A curve showing the relationship between the value of H/L and the motor efficiency shown in FIG. 5 is based on averages of multiple groups of experimental data in the range. When the value of H/L meets the relational expression of $$\frac{1}{10} \leq \frac{Hb1}{Lb1} \leq \frac{1}{2},$$

the motor efficiency is higher than that in the case that the value of H/L does not meet the relational expression, and the effect generated by in a case when meeting the relational expression is more significant when the motor is operated at a low speed. When the length Lb2 and the width Hb2 of the second permanent magnetic 22b in the second mounting groove 32b meet the relational expression of $$\frac{1}{10} \leq \frac{Hb2}{Lb2} \leq \frac{1}{2},$$

the motor efficiency may be further improved. When the length Lb3 and the width Hb3 of the second permanent magnet 23b in the third mounting groove 33b meet the relational expression of $$\frac{1}{10} \leq \frac{Hb3}{Lb3} \leq \frac{1}{2},$$

the motor efficiency may be further improved.

The above relational expressions are preferably applicable to the rotor having three layers of permanent magnets 20, the number of the groups of the permanent magnets 20 is not limited to four poles as shown in FIG. 4, and the relational expressions are also applicable to the rotors with six poles or eight poles.

The permanent magnet embedded in the motor rotor and the through groove of the motor rotor may both be designed to have an arc shape having the same thickness, and may also both be designed to have an arc shape with variable thicknesses, wherein a center portion of the arc is thicker than two ends thereof.

A motor provided by the present application includes the above motor rotor.

The motor according to the present application improves the utilization rate of the permanent magnetic flux and the permanent magnetic torque of the motor without changing the volume of the permanent magnet, by means of adjusting the relationship between the length and the width of the permanent magnet, thereby eventually improving the motor efficiency. The motor according to the present application may be used in air-conditioning compressors, electric cars and fan systems.

Based on the above description, the embodiments according to the present description realize the technical effects as follows.

The motor rotor and the motor having the same improve the utilization rate of the permanent magnetic torque of the motor rotor without changing the usage amount of the permanent magnets, thereby improving the motor efficiency; or reduce the usage amount of the permanent magnets without reducing the motor efficiency, thereby saving materials and reducing the cost of the motor.

The embodiments described hereinabove are only preferred embodiments of the present application, and should not be interpreted as limitation to the present application. For the person skilled in the art, many modifications and variations may be made to the present application. Any modifications, equivalent replacements and improvements made within the spirit and principle of the present application are also deemed to fail into the protection scope of the present application.

What is claimed is:

1. A motor rotor, comprising an iron core and an arc-shaped permanent magnet arranged inside the iron core, wherein,
    a plurality of groups of arc-shaped mounting grooves are arranged in the iron core along a circumferential direction of the iron core, and each group of the arc-shaped mounting grooves comprises two or more than two arc-shaped mounting grooves arranged at intervals in a radial direction of the iron core;
    a plurality of groups of arc-shaped permanent magnets are provided, and the arc-shaped permanent magnets in each group of permanent magnets are correspondingly embedded into corresponding arc-shaped mounting grooves in each group of the arc-shaped mounting grooves;
    on a cross section, perpendicular to an axial direction of the iron core, of the arc-shaped permanent magnet, a length L of the arc-shaped permanent magnet is a distance between two endpoints of a radial outer side, with respect to a center of the iron core, of the arc-shaped permanent magnet, and a width H of the arc-shaped permanent magnet is a distance from a midpoint of a connecting line connecting the two endpoints of the radial outer side of the arc-shaped permanent magnet to a midpoint of a radial inner side, with respect to the center of the iron core, of the arc-shaped permanent magnet, and $$\frac{H}{L} \geq \frac{1}{10}.$$

2. The motor rotor according to claim 1, wherein, each group of the arc-shaped mounting grooves comprises a first arc-shaped mounting groove and a second arc-shaped mounting groove, the arc-shaped permanent magnets embedded in the first arc-shaped mounting groove and the second arc-shaped mounting groove are respectively a first arc-shaped permanent magnet and a second arc-shaped permanent magnet; and a length and a width of the first arc-shaped permanent magnet are respectively La1 and Ha1, and $$\frac{3}{10} \leq \frac{Ha1}{La1} \leq \frac{7}{10}.$$

3. The motor rotor according to claim 2, wherein, a length and a width of the second arc-shaped permanent magnet are respectively La2 and Ha2, and $$\frac{3}{10} \leq \frac{Ha2}{La2} \leq \frac{7}{10}.$$

4. The motor rotor according to claim 1, wherein, each group of the arc-shaped mounting grooves comprises a first arc-shaped mounting groove, a second arc-shaped mounting groove and a third arc-shaped mounting groove, the arc-shaped permanent magnets embedded in the first arc-shaped mounting groove, the second arc-shaped mounting groove and the third arc-shaped mounting groove are a first arc-shaped permanent magnet, a second arc-shaped permanent magnet and a third arc-shaped permanent magnet, respectively; and a length and a width of the first arc-shaped permanent magnet are respectively Lb1 and Hb1, and $$\frac{1}{10} \leq \frac{Hb1}{Lb1} \leq \frac{1}{2}.$$

5. The motor rotor according to claim 4, wherein, a length and a width of the second arc-shaped permanent magnet are respectively Lb2 and Hb2, and $$\frac{1}{10} \leq \frac{Hb2}{Lb2} \leq \frac{1}{2}.$$

6. The motor rotor according to claim 4, wherein, a length and a width of the third arc-shaped permanent magnet are respectively Lb3 and Hb3, and $$\frac{1}{10} \leq \frac{Hb3}{Lb3} \leq \frac{1}{2}.$$

7. A motor comprising the motor rotor, wherein the motor rotor comprises an iron core and an arc-shaped permanent magnet arranged inside the iron core, wherein,
a plurality of groups of arc-shaped mounting grooves are arranged in the iron core along a circumferential direction of the iron core, and each group of the arc-shaped mounting grooves comprises two or more than two arc-shaped mounting grooves arranged at intervals in a radial direction of the iron core;
a plurality of groups of arc-shaped magnets are provided, and arc-shaped permanent magnets in each group of arc-shaped permanent magnets are correspondingly embedded into corresponding arc-shaped mounting grooves in each group of arc-shaped mounting grooves;
on a cross section, perpendicular to an axial direction of the iron core, of the arc-shaped permanent magnet, a length L of the arc-shaped permanent magnet is a distance between two endpoints of a radial outer side, with respect to a center of the iron core, of the arc-shaped permanent magnet, and a width H of the arc-shaped permanent magnet is a distance from a midpoint of a connecting line connecting the two endpoints of the radial outer side of the arc-shaped permanent magnet to a midpoint of a radial inner side, with respect to the center of the iron core, of the arc-shaped permanent magnet, and $$\frac{H}{L} \geq \frac{1}{10}.$$

* * * * *